United States Patent
Saunders

(10) Patent No.: US 9,944,465 B2
(45) Date of Patent: Apr. 17, 2018

(54) SOLID PARTICULATE PUMP HAVING FLEXIBLE SEAL

(71) Applicant: Timothy Saunders, Sacramento, CA (US)

(72) Inventor: Timothy Saunders, Sacramento, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 118 days.

(21) Appl. No.: 14/889,319

(22) PCT Filed: Jun. 2, 2014

(86) PCT No.: PCT/US2014/040460
§ 371 (c)(1),
(2) Date: Nov. 5, 2015

(87) PCT Pub. No.: WO2014/200745
PCT Pub. Date: Dec. 18, 2014

(65) Prior Publication Data
US 2016/0083187 A1    Mar. 24, 2016

Related U.S. Application Data

(60) Provisional application No. 61/834,520, filed on Jun. 13, 2013.

(51) Int. Cl.
| | | |
|---|---|---|
| B65G 15/14 | (2006.01) | |
| F04B 15/00 | (2006.01) | |
| F04B 15/02 | (2006.01) | |
| F04B 19/08 | (2006.01) | |
| F04B 19/14 | (2006.01) | |
| F04B 19/20 | (2006.01) | |
| F04B 19/24 | (2006.01) | |
| B65G 37/00 | (2006.01) | |
| C10J 3/50 | (2006.01) | |

(52) U.S. Cl.
CPC .......... B65G 15/14 (2013.01); B65G 37/00 (2013.01); C10J 3/50 (2013.01); F04B 15/00 (2013.01);
(Continued)

(58) Field of Classification Search
CPC ...... B65G 15/14; B65G 17/065; B65G 17/26; B65G 17/30; B65G 17/32; B65G 37/00;
(Continued)

(56) References Cited

U.S. PATENT DOCUMENTS

| | | | |
|---|---|---|---|
| 3,904,028 A * | 9/1975 | Muller | ................ B65G 17/002 |
| | | | 198/850 |
| 4,154,560 A | 5/1979 | Streicher | |

(Continued)

FOREIGN PATENT DOCUMENTS

| | | |
|---|---|---|
| EP | 0 930 254 A1 | 7/1999 |
| EP | 1 900 941 A2 | 3/2008 |

(Continued)

OTHER PUBLICATIONS

Concurrently filed, Co-pending U.S. Patent Application, Saunders, Timothy, "Particulate Pump with Rotary Drive and Integral Chain,", U.S. Appl. No. 14/889,301.

*Primary Examiner* — Leslie A Nicholson, III
*Assistant Examiner* — Keith R Campbell
(74) *Attorney, Agent, or Firm* — Pauley Erickson & Kottis

(57) ABSTRACT

A solid particulate pump includes a plurality of segments linked to each other in a serial, closed loop arrangement with gaps between neighboring pairs of the segments. A flexible seal extends across the gaps and seals an interior of the closed loop arrangement from an exterior of the closed loop arrangement.

16 Claims, 4 Drawing Sheets

(52) U.S. Cl.
 CPC .............. *F04B 15/02* (2013.01); *F04B 19/08* (2013.01); *F04B 19/14* (2013.01); *F04B 19/20* (2013.01); *F04B 19/24* (2013.01); *C10J 2200/15* (2013.01)

(58) Field of Classification Search
 CPC .......... F04B 15/00; F04B 15/02; F04B 19/08; F04B 19/14; F04B 19/20; F04B 19/24; C10J 3/50; C10J 2200/15
 See application file for complete search history.

(56) References Cited

U.S. PATENT DOCUMENTS

| | | | | |
|---|---|---|---|---|
| 4,274,536 | A * | 6/1981 | Riegler | B65G 17/08 165/120 |
| 4,682,686 | A * | 7/1987 | Ueda | B65G 17/067 198/850 |
| 4,697,696 | A * | 10/1987 | Howe | B65G 17/067 198/822 |
| 4,840,269 | A * | 6/1989 | Anderson | B65G 17/067 198/822 |
| 5,137,144 | A * | 8/1992 | Uehara | B65G 17/10 198/698 |
| 7,789,221 | B2 * | 9/2010 | Lapeyre | B65G 15/34 198/844.2 |
| 2010/0025200 | A1 * | 2/2010 | Fandella | B29C 45/0017 198/850 |
| 2010/0320061 | A1 * | 12/2010 | Saunders | B65G 15/14 198/626.1 |
| 2011/0139257 | A1 | 6/2011 | Bielenberg et al. | |
| 2012/0006624 | A1 | 1/2012 | Russell | |
| 2012/0097506 | A1 | 4/2012 | Bebejian | |
| 2012/0321444 | A1 | 12/2012 | Sonwane et al. | |
| 2013/0081925 | A1 | 4/2013 | Stevenson et al. | |

FOREIGN PATENT DOCUMENTS

| | | |
|---|---|---|
| EP | 2 377 788 A2 | 10/2011 |
| GB | 818091 | 8/1959 |
| WO | WO 95/06610 | 3/1995 |

* cited by examiner

SOLID PARTICULATE PUMP HAVING FLEXIBLE SEAL

CROSS-REFERENCE TO RELATED APPLICATION

The present disclosure claims benefit to Provisional Application Ser. No. 61/834,520 filed on Jun. 13, 2013.

BACKGROUND

This disclosure relates to a solid particulate pump for transporting particulate material.

Processing of particulate material can require transportation of the material from one environment into another, such as from a relatively low pressure environment to a relatively high pressure environment. For example, coal gasification involves the conversion of coal or other carbonaceous particulate material into synthesis gas. A coal gasification system typically operates at pressures above the ambient surroundings. A feeder or pump is used to introduce pulverized, particulate coal or other particulated carbonaceous material from the relatively low pressure surrounding environment into the higher pressure coal gasification system.

SUMMARY

A solid particulate pump according to an example of the present disclosure includes a plurality of segments. Each segment has an inner link and an outer tile. The plurality of segments attach to each other in a serial, closed loop arrangement, with gaps between adjacent segments. A flexible seal extends across the gaps and seals an interior of the gap from fluid communication with an exterior of the gap.

In a further embodiment of any of the foregoing embodiments, the segments include respective upper working surfaces, and the flexible seal is below the upper working surfaces, with respect to the interior of the serial, closed loop arrangement.

In a further embodiment of any of the foregoing embodiments, the upper working surfaces of the neighboring pairs of the segments overlap.

In a further embodiment of any of the foregoing embodiments, the segments include, respectively, links secured with, respectively, tile segments that have upper working surfaces, and the flexible seal is secured between the links and the tile segments.

In a further embodiment of any of the foregoing embodiments, the flexible seal is slack across the gaps.

In a further embodiment of any of the foregoing embodiments, the flexible seal includes folds across the gaps.

In a further embodiment of any of the foregoing embodiments, the gaps vary in size between a maximum gap size and a minimum gap size as a function location of the neighboring pairs of the segments around the serial, closed loop arrangement, and the flexible seal is slack at the maximum gap size.

In a further embodiment of any of the foregoing embodiments, the flexible seal is folded at the minimum gap size.

In a further embodiment of any of the foregoing embodiments, the segments include, respectively, links secured with, respectively, tile segments that have upper working surfaces, the tile segments each having a first width perpendicular to a length direction around the serial, closed loop arrangement, and the flexible seal having a second width also perpendicular to the length direction that is greater than the first width.

A further embodiment of any of the foregoing embodiments includes an anti-crimp device operable to prevent crimping of portions of the flexible seal lateral of the gaps.

In a further embodiment of any of the foregoing embodiments, the anti-crimp device includes an inner belt and an outer belt extending around the serial, closed loop arrangement, the inner belt and the outer belt being stiffer than the flexible seal, and the flexible seal being sandwiched between the inner belt and the outer belt.

In a further embodiment of any of the foregoing embodiments, the flexible seal includes an elastomer.

In a further embodiment of any of the foregoing embodiments, the flexible seal includes a fiber-reinforced elastomer.

A solid particulate pump for transporting particulate material according to an example of the present disclosure includes a feeder inlet, a feeder outlet downstream from the feeder inlet and a particulate conveyor operable to transport a particulate material from the feeder inlet to the feeder outlet. The particulate conveyor includes a plurality of segments linked to each other in a serial, closed loop arrangement, with gaps between neighboring pairs of the segments. A flexible seal extends across the gaps and seals an interior of the serial, closed loop arrangement from an exterior of the serial, closed loop arrangement.

In a further embodiment of any of the foregoing embodiments, a lateral side of the flexible seal abuts a lateral wall adjacent the particulate conveyor.

In a further embodiment of any of the foregoing embodiments, the particulate conveyor at least partially defines a linear passage between the feeder inlet and the feeder outlet.

A method for managing fouling of a solid particulate pump for transporting particulate material according to an example of the present disclosure includes transporting a particulate material from a solid particulate pump inlet to a solid particulate pump outlet downstream from the solid particulate pump inlet using a closed loop, particulate conveyor and sealing an interior of the closed loop, particulate conveyor from the particulate material located at an exterior of the closed loop, particulate conveyor to limit infiltration of the particulate material into the interior of the closed loop particulate conveyor.

In a further embodiment of any of the foregoing embodiments, the sealing includes sealing using a flexible seal across the gaps.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
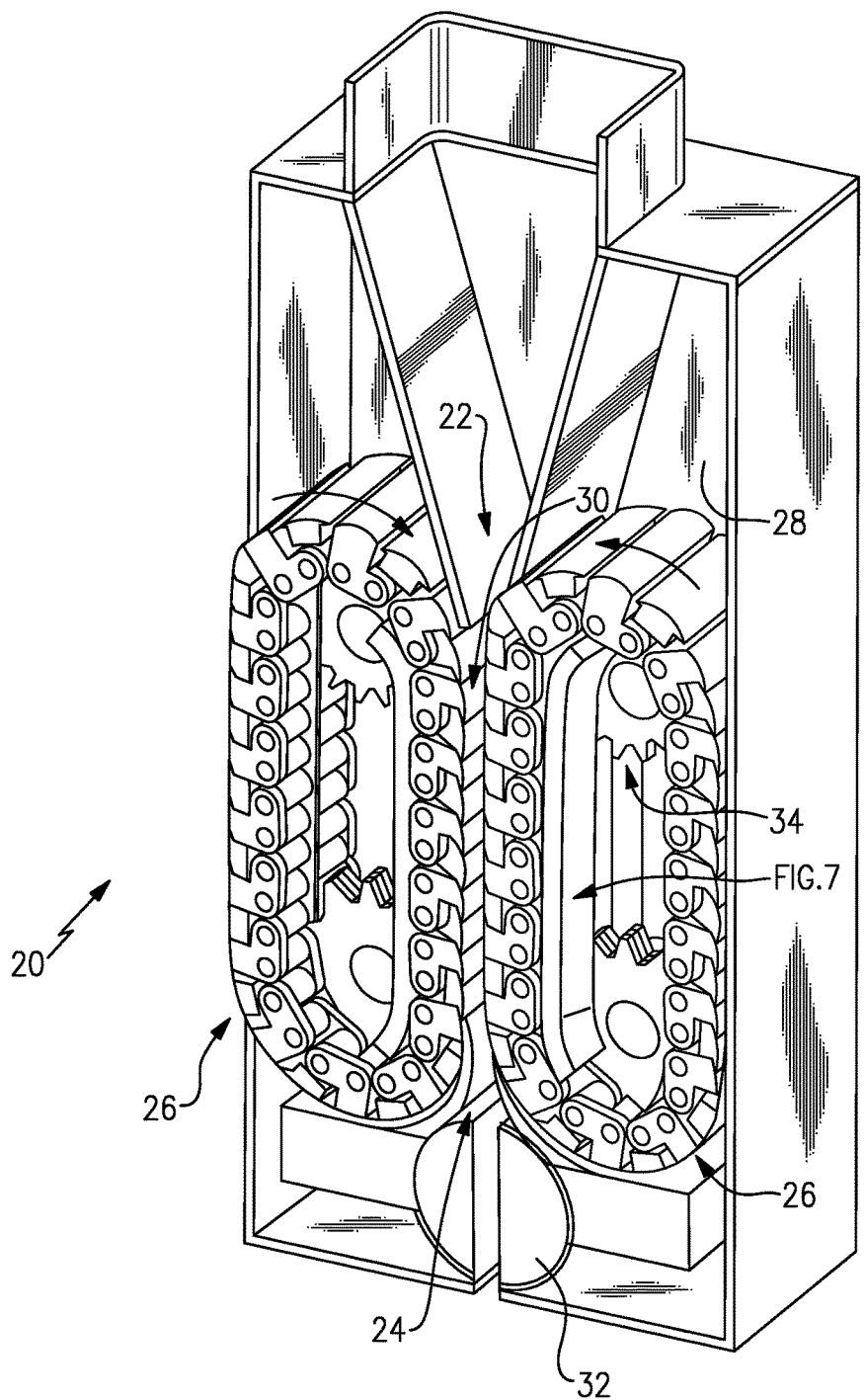
FIG. 1 illustrates an example solid particulate pump.

FIG. 1 illustrates an example solid particulate pump 20 adapted for transporting particulate material, such as but not limited to, particulated carbonaceous materials. Such materials can include feed stocks such as petcoke, coal, sub-bit coal or the like, for example. As will be appreciated from this disclosure, the solid particulate pump 20 includes various moveable components that operate to transport particulate material from a feeder inlet 22 to a feeder outlet 24 located downstream from the feeder inlet 22. Although shown as a linear, positive displacement-type pump in the illustrated example, the solid particulate pump 20 can alternatively be a rotary or other non-linear positive displacement-type pump. As will be described in further detail below, the solid particulate pump 20 includes features for managing infiltration of particulate material into the moveable components, which can otherwise lead to a build-up of particulate material and fouling of the components.

In the illustrated example, the solid particulate pump 20 includes two particulate conveyors 26 that are arranged opposite of each other to provide moving side walls of the solid particulate pump 20. Lateral walls 28 flank the particulate conveyors 26. In the illustration, the rear lateral wall 28 is shown and a forward lateral wall has been removed for the purposes of viewing the inside of the solid particulate pump 20. Together, the particulate conveyors 26 and the lateral walls 28 define a passage 30 through which particulate matter is transported between the feeder inlet 22 and the feeder outlet 24. In one example based on a coal gasification system, the feeder inlet 22 would be at a lower pressure than the feeder outlet 24 and thus the solid particulate pump 20 would operate to transport the particulate material from a low pressure environment into a high pressure environment. The particulate conveyors 26 of the illustrated example transport the particulate material without substantially "grinding" the material such that the particulate material, on average, has a similar size before and after the solid particulate pump 20.

In this example, the passage 30 has a substantially uniform cross-sectional area from the feeder inlet 22 to the feeder outlet 24, although the passage 30 can alternatively converge to the feeder outlet 24. Additionally, although shown with two particulate conveyors 26, it is to be understood that the examples herein are not limited to such an arrangement and that other feeder designs can include additional particulate conveyors 26 or a single particulate conveyor 26. Optionally, a valve 32 is situated near the feeder outlet 24 for metering particulate material as it discharges from the passage 30.

Figure 2:
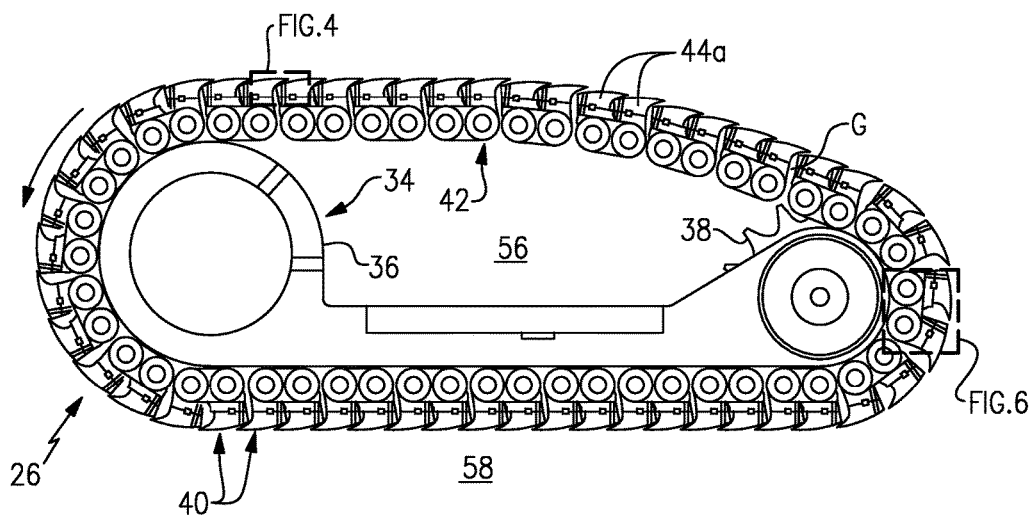
FIG. 2 illustrates an example particulate conveyor.

Referring also to FIG. 2 showing a side view of a representative one of the particulate conveyors 26, the particulate conveyor 26 is mounted on a load beam return track trajectory 34 that is operable to move the particulate conveyor 26 and thus transport the particulate material through the solid particulate pump 20. In this example, the load beam return track trajectory 34 includes a load beam 36 that supports a drive sprocket 38 that engages the particulate conveyor 26. The load beam 36 can include a track (not shown) on its outside surface for guiding movement of the particulate conveyor 26 there around.

Figure 3:
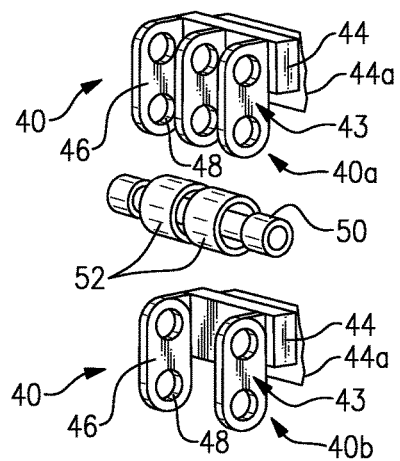
FIG. 3 illustrates an exploded view of a neighboring pair of segments of a particulate conveyor.

As depicted in FIG. 2, the particulate conveyor 26 includes a plurality of distinct segments 40 that are attached or linked to each other in a serial, closed loop arrangement 42. FIG. 3 illustrates an exploded view of a representative neighboring pair of the segments 40. Each neighboring pair of adjacent segments 40 includes a forward segment 40a and a rear or trailing segment 40b. Each of the forward and rear segments 40a/40b includes an inner link 43 and an outer tile segment 44 that is secured to the respective link 43. The tile segments 44 include upper working surfaces 44a that are directly exposed to the particulate material in the passage 30. The working surfaces 44a overlap each other, as depicted in FIG. 2, and serve to support and act upon the particulate material in the passage 30. In other examples, the working surfaces 44a can include contours other than shown, cup structures, carriages or other such features that are directly exposed to the particulate material and facilitate transport thereof.

Each of the links 43 includes link plates 46 with orifices 48 that are used to connect the segments 40 in the closed loop arrangement 42. The segments 40a/40b include a different number of link plates 46, which are pivotably connected together by a link axle 50 upon which wheels 52 are mounted for guiding the particulate conveyor 26 on the load beam 36.

Figure 4:
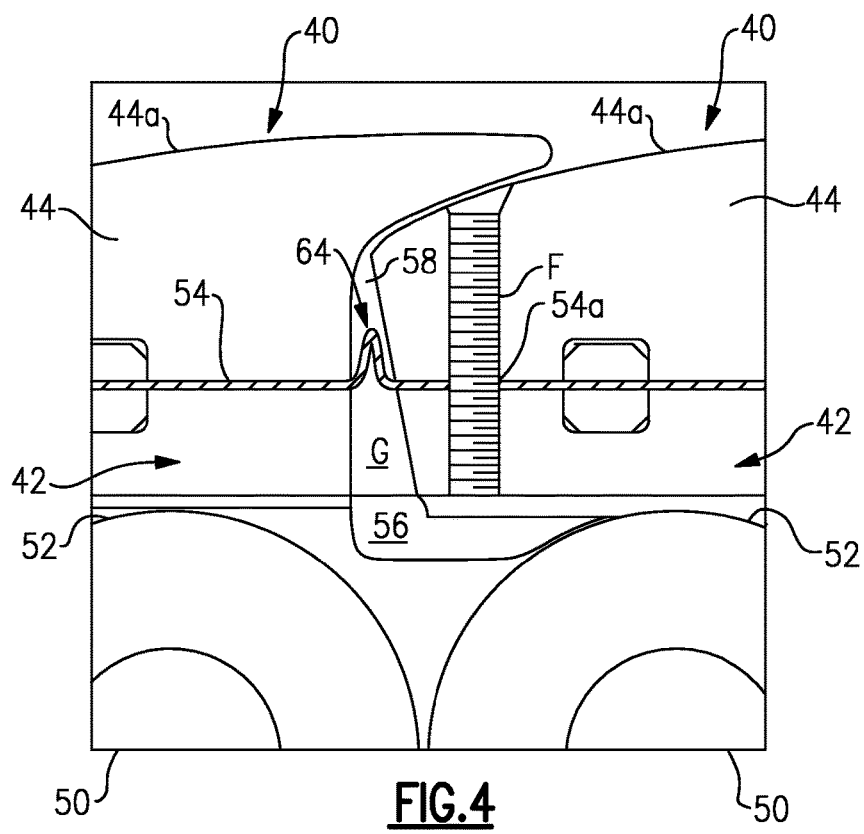
FIG. 4 illustrates a magnified view of a section of the particulate conveyor according to FIG. 2.

FIG. 4 illustrates a magnified view of a neighboring pair of the segments 40 according to the section shown in FIG. 2. There is a gap, G, between the neighboring pair of the segments 40. A flexible seal 54 extends across the gap and seals an interior 56 (FIG. 2) of the gap from an exterior 58 (FIG. 2) of the gap. In one example, the flexible seal 54 is an endless, closed loop that is incorporated into the segments 40. Alternatively, the flexible seal 54 can be segmented such that each flexible seal segment extends across a corresponding gap G between a neighboring pair of the segments 40. In other words, the flexible seal 54 can be endless or segmented. But for the flexible seal 54, the particulate material can infiltrate from the exterior 58 to the interior 56 and build-up between the segments 40 and around stationary and moving parts of the solid particulate pump 20. This build-up can hinder movement of parts, such as the sprocket 38 and wheels 52, and can also hinder relative movement between segments 40 to alter the path of the segments 40 around the closed loop arrangement 42. The flexible seal 54 thus serves as a particle barrier to the particulate material and prevents infiltration of the particulate material to enhance reliability of the solid particulate pump 20.

Figure 5:
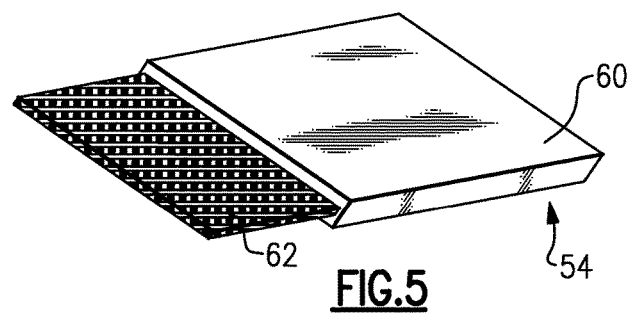
FIG. 5 illustrates a portion of a flexible seal of a particulate conveyor.

FIG. 5 shows a partially cut-away view of a representative portion of the flexible seal 54. The flexible seal 54 is macroscopically non-porous and includes an elastomer 60 for flexibility. In some examples, the elastomer 60 includes polychloroprene, a fluoropolymer-containing elastomer (e.g., polytetrafluoroethylene) or other flexible material. Further, as also shown in FIG. 5, a portion of the elastomer 60 is cut-away to reveal reinforcement fibers 62 of the flexible seal 54. The reinforcement fibers 62 are provided as a woven fabric that is embedded in the elastomer 60. In other examples, the fibers 62 can have other fiber structures, such as but not limited to, random, chopped fiber structures, non-woven structures, unidirectional structures, three-dimensional structures or the like. In one example, the fibers 62 are polyamide fibers, which are relatively flexible and thus do not rigidize the flexible seal 54. Alternatively, the fibers 62 can be made of other compositions of polymers, carbon, glass, metal or combinations thereof, as long as the flexible seal 54 is not rendered too stiff to effectively turn around the ends of the closed loop arrangement 42.

As shown in FIG. 4, the flexible seal 54 is located below the upper working surfaces 44a of the segments 40, relative to the interior 56 (FIG. 2) of the gap and closed loop arrangement. Thus, the working surfaces 44a bear the load of the particulate material and are arranged to shield the flexible seal 54 from direct exposure to the particulate material.

The flexible seal 54 is secured, or sandwiched, between the respective tile segments 44 and links 43. In this example, the tile segments 44 are secured to the respective links 43 with fasteners, F. The fasteners F can be threaded bolts or the like. Multiple fasteners F can be used to secure each tile segment 44 to each link 43. In this regard, the flexible seal 54 can include corresponding orifices 54a through which the fasteners are received. The tightening of the fasteners clamps the flexible seal 54 between the tile segments 44 and the links 43.

Figure 6:
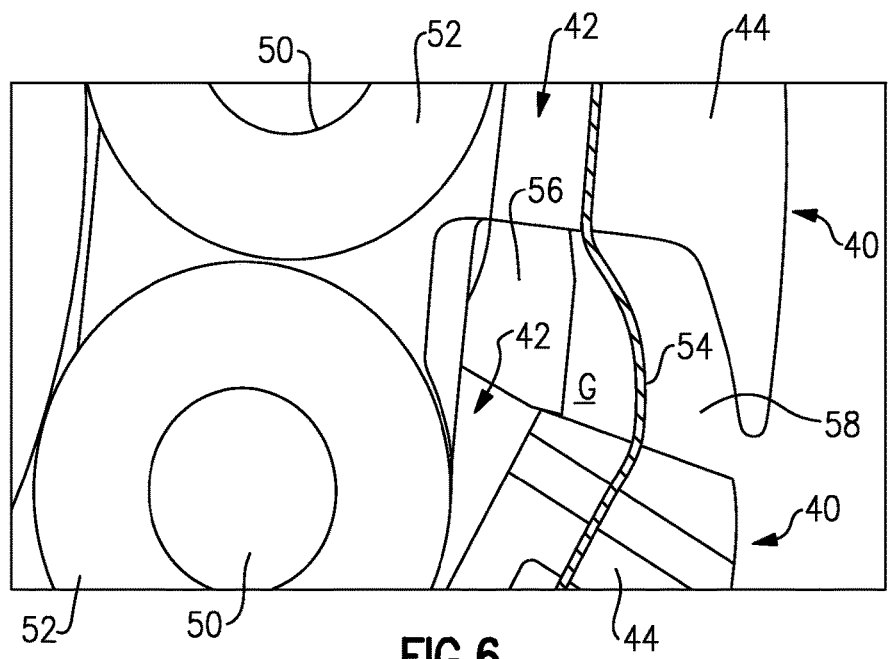
FIG. 6 illustrates another portion of the particulate conveyor according to FIG. 2.

Referring again to FIG. 2, as the particulate conveyor 26 moves around the sprocket 38, the size of the gap G varies as a function of location of the segments 40 along the closed loop arrangement 42. For instance, at locations along linear stretches, such as at the bottom or the top of the closed loop arrangement 42 in FIG. 2, there is a minimum gap size, which is depicted in FIG. 4. At locations along the ends of the closed loop arrangement 42 where the particulate conveyor 26 turns, the size of the gap G increases to a maximum gap size, which is depicted in FIG. 6. The flexible seal 54 is slack across the gaps G such that it is not stretched beyond its elastic limit when as the gaps G change between the minimum and maximum gap size.

At the minimum gap size, the flexible seal 54 is sufficiently flexible to form a fold 64 (FIG. 4) within the gap. The fold 64 can be upwardly oriented, as shown, or downwardly oriented. As the segments 40 move and turn around the ends of the closed loop arrangement 42 such that a given gap reaches its maximum size, the flexible seal 54 unfolds from the folded state shown in FIG. 4 to an extended, but still slack or unbuckled state, as shown in FIG. 6.

Figure 7:
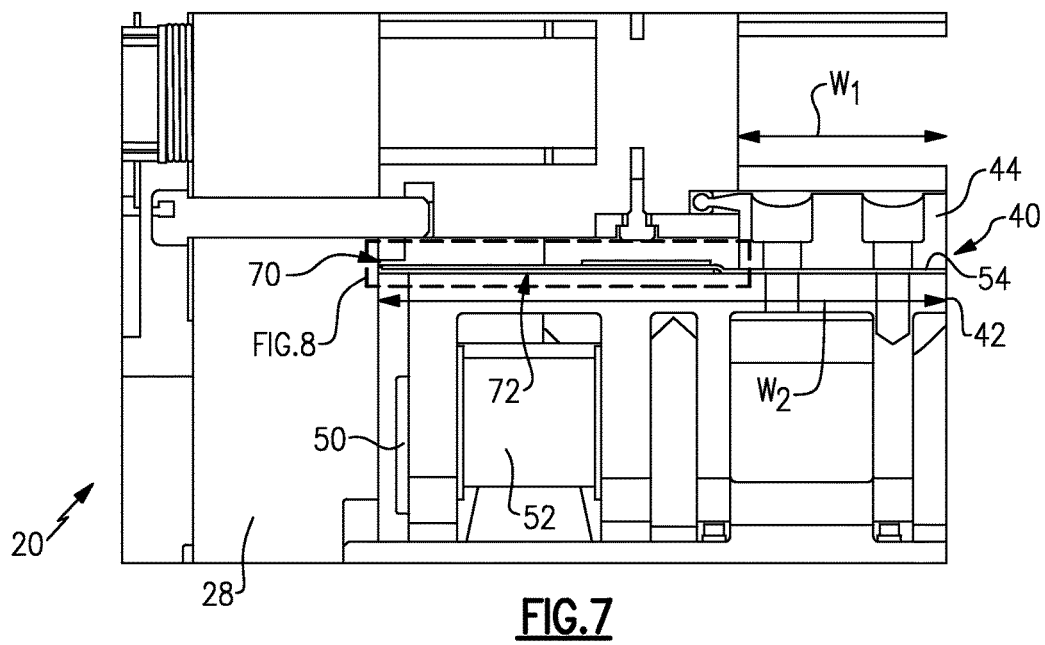
FIG. 7 illustrates a sectioned view of the solid particulate pump according to FIG. 1.

FIG. 7 illustrates a lateral view of the solid particulate pump 20 according to the section shown in FIG. 1. Relative to the length direction around the closed loop arrangement 42, the tile segment 44 has a width, $W_1$, and the flexible seal 54 has a width, $W_2$, that is greater than the width $W_1$. Thus, the flexible seal 54 extends laterally of each tile segment 44 and abuts lateral wall 28, at seal abutment 70.

Figure 8:
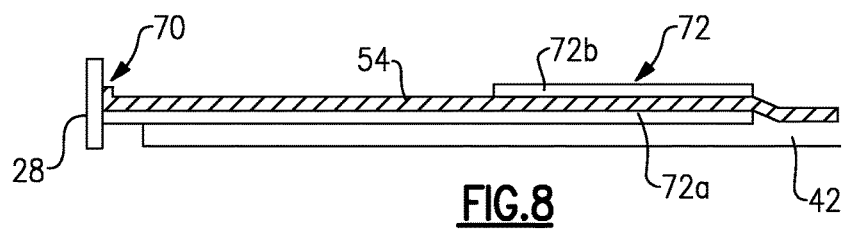
FIG. 8 illustrates a view of the solid particulate pump according to FIG. 7.

An anti-crimp device 72, as also shown in FIG. 8, may optionally be included in the solid particulate pump 20 to prevent crimping of the portions of the flexible seal 54 lateral of the gaps G and tile segments 44. In this example, the anti-crimp device 72 includes an inner belt 72a and an outer belt 72b that extend around the particulate conveyor 26, with the flexible seal 54 sandwiched in between. The inner belt 72a can be secured to the respective links 43 using a fastener, adhesive or the like. Similarly, the outer belt 72b can be secured to the respective links 43 with a fastener or the like. The belts 72a/72b are stiffer than the flexible seal 54 and thus retain the flexible seal 54 and limit or prevent bunching or crimping as the segments 40 move around the load beam return track trajectory 34. That is, the flexible seal 54 can fold and extend in the region of the gaps G, yet does not fold, crimp or bunch in the areas lateral to the gaps G, which could otherwise serve to accumulate particulate material in those lateral areas. Further, the seal abutment 70 between the flexible seal 54 and the lateral walls 28 also serves to ensure that no particulate material circumvents the flexible seal 54 to infiltrate the interior 56 of the closed loop arrangement 42.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A solid particulate pump comprising
a plurality of segments, each segment having an upper working surface, an inner link and an outer tile, the plurality of segments attached to each other in a serial, closed loop arrangement, with gaps between adjacent segments;
a flexible seal comprising an endless, closed loop, the flexible seal extending across the gaps and sealing an interior of the gap and preventing infiltration of particulate material from an exterior of the gap, wherein the flexible seal is positioned below the upper working surfaces, with respect to the interior of the serial, closed loop arrangement; and
wherein the upper working surface bears a load of a particulate material and shields the flexible seal from direct exposure to the particulate material.

2. The solid particulate pump as recited in claim 1, wherein the upper working surfaces of the neighboring pairs of the segments overlap.

3. The solid particulate pump as recited in claim 1, wherein the segments include, respectively, links secured with, respectively, tile segments that have upper working surfaces, and the flexible seal is secured between the links and the tile segments.

4. The solid particulate pump as recited in claim 1, wherein the flexible seal is slack across the gaps.

5. The solid particulate pump as recited in claim 1, wherein the flexible seal includes folds across the gaps.

6. The solid particulate pump as recited in claim 1, wherein the gaps vary in size between a maximum gap size and a minimum gap size as a function of location of the neighboring pairs of the segments around the serial, closed loop arrangement, and the flexible seal is slack at the maximum gap size.

7. The solid particulate pump as recited in claim 6, wherein the flexible seal is folded at the minimum gap size.

8. The solid particulate pump as recited in claim 1, wherein the flexible seal includes an elastomer.

9. The solid particulate pump as recited in claim 1, wherein the flexible seal includes a fiber-reinforced elastomer.

10. A solid particulate pump comprising:
a plurality of segments, each segment having an inner link and an outer tile, the plurality of segments attached to each other in a serial, closed loop arrangement, with gaps between adjacent segments;
a flexible seal extending across the gaps and sealing an interior of the gap from fluid communication with an exterior of the gap; and
wherein the segments include, respectively, links secured with, respectively, tile segments that have upper working surfaces, the tile segments each having a first width perpendicular to a length direction around the serial, closed loop arrangement, and the flexible seal having a second width also perpendicular to the length direction that is greater than the first width.

11. A solid particulate pump comprising:
a plurality of segments, each segment having an inner link and an outer tile, the plurality of segments attached to each other in a serial, closed loon arrangement, with gaps between adjacent segments;
a flexible seal extending across the gaps and sealing an interior of the gap from fluid communication with an exterior of the gap; and
an anti-crimp device operable to prevent crimping of portions of the flexible seal lateral of the gaps.

12. The solid particulate pump as recited in claim 11, wherein, the anti-crimp device includes an inner belt and an outer belt extending around the serial, closed loop arrangement, the inner belt and the outer belt being stiffer than the flexible seal, and the flexible seal being sandwiched between the inner belt and the outer belt.

13. A solid particulate pump for transporting particulate material comprising:
a feeder inlet;
a feeder outlet downstream from the feeder inlet;
a particulate conveyor operable to transport a particulate material from the feeder inlet to the feeder outlet, the particulate conveyor including a plurality of segments having an upper working surface, the plurality of segments linked to each other in a serial, closed loop arrangement, with gaps between neighboring pairs of the segments, and a flexible seal extending across the gaps and sealing an interior of the serial, closed loop arrangement from an exterior of the serial, closed loop arrangement, and wherein the upper working surface bears a load of the particulate material and shields the flexible seal front direct exposure to the particulate material.

14. The feeder as recited in claim 13, wherein a lateral side of the flexible seal abuts a lateral wall adjacent the particulate conveyor.

15. The feeder as recited in claim 13, wherein the particulate conveyor at least partially defines a linear passage between the feeder inlet and the feeder outlet.

16. A method for managing fouling of a solid particulate pump for transporting particulate material, the method comprising:
transporting a particulate material from a solid particulate pump inlet to a solid particulate pump outlet downstream from the solid particulate pump inlet using a closed loop, particulate conveyor, wherein the particulate conveyor includes a plurality of segments each including an upper working surface;
sealing an interior of the closed loop, particulate conveyor with a flexible seal from the particulate material located at an exterior of the closed loop, particulate conveyor to limit infiltration of the particulate material into the interior of the closed loop particulate conveyor; and
wherein the upper working surface bears a load of the particulate material and shields the flexible seal from direct exposure to the particulate material.

* * * * *